US012736336B2

(12) United States Patent
Gfoellner et al.

(10) Patent No.: US 12,736,336 B2
(45) Date of Patent: Sep. 15, 2026

(54) METHOD FOR TESTING POSITIONING DEVICES

(71) Applicant: MAGNA STEYR Fahrzeugtechnik AG & Co KG, Graz (AT)

(72) Inventors: Michael Gfoellner, Schwalmtal (AT); Christoph Kribernegg, Neuss (AT); Werner Neuhold, Weitendorf (AT)

(73) Assignee: MAGNA STEYR Fahrzeugtechnik AG & Co KG, Graz (AT)

( * ) Notice: Subject to any disclaimer, the term of this patent is extended or adjusted under 35 U.S.C. 154(b) by 1038 days.

(21) Appl. No.: 17/666,879

(22) Filed: Feb. 8, 2022

(65) Prior Publication Data

US 2022/0260367 A1 Aug. 18, 2022

(30) Foreign Application Priority Data

Feb. 15, 2021 (DE) ........................ 102021201392.9

(51) Int. Cl.
*G01B 21/04* (2006.01)
*B65G 17/12* (2006.01)

(52) U.S. Cl.
CPC ............ *G01B 21/04* (2013.01); *B65G 17/12* (2013.01)

(58) Field of Classification Search
CPC .................................................... G01B 21/04
See application file for complete search history.

(56) References Cited

U.S. PATENT DOCUMENTS 4,989,981 A * 2/1991 Kawamura .......... G01B 11/002 356/602
5,648,846 A * 7/1997 Douine .................. G01B 5/255 356/141.5

(Continued)

FOREIGN PATENT DOCUMENTS

DE 4214863 A1 11/1993
DE 102006046050 A1 7/2008

(Continued)

OTHER PUBLICATIONS

Hoselanton, DE102006046050A1 (machine translated English version) (2008).*

(Continued)

*Primary Examiner* — Hyun D Park
(74) *Attorney, Agent, or Firm* — Jordan IP Law LLC; Todd A. Vaughn

(57) ABSTRACT

A method for testing the dimensional accuracy of transportable positioning devices for the production of a motor vehicle. The method includes providing locaters on positioning devices so that each body component of the motor vehicle is accurately geometrically positioned on a respective one of the positioning devices. The method also includes moving, in a motor vehicle production cycle, the positioning devices with the respective body component positioned thereon to different workstations. The method further includes measuring, by a control unit during the motor vehicle production cycle in the workstations and/or in an inline measuring station for an acquisition of measured values in the motor vehicle production cycle, predefined measuring points on each body component positioned on the positioning device. The method additionally includes evaluating, by the control unit, the predefined measuring points to (Continued)

determine a dimensional accuracy of the transportable positioning device.

16 Claims, 5 Drawing Sheets

(56) References Cited

U.S. PATENT DOCUMENTS

| | | | | |
|---|---|---|---|---|
| 2006/0102408 | A1* | 5/2006 | Suita | G01M 11/067<br>180/233 |
| 2015/0246700 | A1* | 9/2015 | Kilibarda | F16B 9/056<br>29/799 |

FOREIGN PATENT DOCUMENTS

| | | | |
|---|---|---|---|
| DE | 102010015031 | A1 | 11/2010 |
| WO | 9322186 | A1 | 11/1993 |

OTHER PUBLICATIONS

SIPO First office action for CN 202210136560.4, dated Jan. 9, 2025.

* cited by examiner

METHOD FOR TESTING POSITIONING DEVICES

CROSS-REFERENCE TO RELATED APPLICATIONS

The present application claims priority under 35 U.S.C. § 119 to German Patent Publication No. DE 102021201392.9 (filed on Feb. 15, 2021), which is hereby incorporated by reference in its complete entirety

TECHNICAL FIELD

Embodiments relate to a method for testing the dimensional accuracy of transportable positioning devices for the production of motor vehicles.

BACKGROUND

In automotive engineering, it is known to provide relatively large and rigid components, such as in particular body parts, precisely positioned in workstations, so that these components can be further processed or equipped in order to ultimately produce a motor vehicle or motor vehicle part. Some manufacturers use positioning devices which are permanently installed in the workstations to locate the body components.

More recently, it is also known to use transportable positioning devices. On the one hand, transportable positioning devices enable a positionally-accurate location of a component, in particular a body component. Transportable positioning devices are also transported themselves together with a component positioned on the positioning device, in particular, via a suitable conveyor technology, from one workstation to a next workstation. Such positioning devices are also called "geo-skids." In turn, the positioning devices can be positioned geometrically precisely in the respective workstations via the conveyor technology. In this way, it can be ensured that the component to be manufactured, or the body to be manufactured, can be reproducibly equally positioned in a vehicle coordinate system for all manufacturing processes in different workstations or processing cells.

The positioning devices thus form a geometrically oriented connection between a conveyor system and the product to be manufactured and also enable the production of multiple different products or vehicle types within a closed manufacturing process.

Usually, such transportable positioning devices or geo-skids are regularly tested outside the production cycle in a separate measuring station or a measuring room. For this purpose, the positioning devices are discharged at defined intervals from the body construction process, i.e., from the motor vehicle production cycle, transported to a measuring room, checked there via a 3D coordinate measuring device, adjusted, checked again for verification, and fed rear into the process. Here, the positioning devices are measured directly or measuring points are recorded directly on the positioning device. The frequency of such checks of the dimensional accuracy of the positioning devices can be about 1 to 4 checks per year, for example.

SUMMARY

One or more embodiments relate are to specify a method for testing the dimensional accuracy of transportable positioning devices for the production of motor vehicles which takes little additional time in the series production of motor vehicles, and yet allows the reliable elimination of faulty positioning devices. In this way, the method as a whole enables an efficient and dimensionally stable series production of motor vehicles.

The technical solution of one or more embodiments is carried out by a method for testing the dimensional accuracy of transportable positioning devices for the production of motor vehicles, in which the positioning devices each have locators, so that a body component of a motor vehicle to be manufactured can be positioned geometrically exactly on the positioning device. Also, the positioning devices with the body component positioned thereon are moved to different workstations in a motor vehicle production cycle for the production of the motor vehicles. During the motor vehicle production cycle, in the workstations and/or in an inline measuring station specifically provided for the acquisition of measured values in the motor vehicle production cycle, predefined measuring points on the body component positioned on the positioning device are measured. The dimensional accuracy of the transportable positioning device is determined by a control unit (e.g., a computing device including at least one computer readable medium comprising a set of instructions to be executed by one or more processors of the computing device) by evaluating the measuring points.

In accordance with one or more embodiments, transportable positioning devices are indirectly measured by measuring the position of measuring points on the transported body components, preferably, the three-dimensional position, i.e., the 3D coordinates of the predefined measuring points on the transported component. These measurements are made in the normal motor vehicle production cycle, i.e., in the usual cycle process of the positioning devices and the body components. In accordance with one or more embodiments, a control unit is designed to conclude from the measuring points, and in particular from deviations of the measuring points from provided standard values, probable errors of the positioning devices, i.e., the dimensional accuracies thereof and in particular dimensional accuracies outside a defined tolerance range. Such faulty positioning devices can then be discharged, for example, into a separate measuring station or control station outside the normal motor vehicle production cycle and corrected or rejected, for example.

Due to the measurement during ongoing production operation of the vehicle production, the inspection and possible maintenance or elimination of unsuitable positioning devices can be carried out without significant time losses and thus particularly efficiently. The measurement is thus carried out in an inline measuring station or workstation in the production process. The inline measurement can be carried out in the workstations and/or in an inline measuring station specifically provided in the production process for the acquisition of measured values. Thus, a station in the production process usually equipped with a high-precision measuring device for the detection of measuring points M can be used for the purpose of process monitoring for the mediated, indirect measurement of the positioning devices. This evaluation of the dimensional accuracy of the positioning devices is to be distinguished from the preferred additional evaluation of the same measuring points with regard to the dimensional accuracy of the body component itself.

In accordance with one or more embodiments, the predefined measuring points and the measuring system are already available as standard for process control of the body component or for checking the dimensional accuracy of the body component itself, so that no additional measuring points and no additional measuring systems are required to check the dimensional accuracy of the transportable positioning device or the geo-skid.

In accordance with one or more embodiments, no additional measurements are carried out to check the dimensional accuracy of the transportable positioning device or the geo-skid or no additional measurement time which would slow down the production process is required. Existing measuring points/measurement data, which are required to check the body component itself and are therefore available, are evaluated accordingly so that a conclusion is drawn about the dimensional accuracy of the positioning device, i.e., the geo-skid.

In accordance with one or more embodiments, the positioning devices are identified in the control unit, so each has a unique ID or a unique identifier. In accordance with one or more embodiments, during multiple motor vehicle production cycles in the workstations and/or in an inline measuring station specifically provided for the acquisition of measured values or a measuring room, positions of predefined measuring points preferably on the body component positioned on the same identified positioning device are measured, wherein by evaluating the measuring points of the same identified positioning device in the multiple motor vehicle production cycles by the control unit, the dimensional accuracy of the respective identified transportable positioning device is determined. Thus, tracking of the individual, identified positioning devices is preferably carried out over multiple motor vehicle production cycles, i.e., over multiple cycles or production cycles. From the behaviour of the measured values or measured value deviations in the case of multiple different supported body components, it is easier to deduce which deviations are related to properties of the changing, transported body component and which deviations are related to properties of the identified geo-skid used. Through this methodology, not only can individual component-specific or component batch-specific influences be advantageously excluded, but also other external influences such as vibrations, light, contamination, etc. can be excluded.

In accordance with one or more embodiments, the predefined measuring points on the respective body component positioned on the positioning device are assigned by the control unit for the evaluation of the measuring points to one or more predefined measuring point groups, wherein respective measuring points behaving in a correlated way are grouped in a measuring point group. All measuring points are thus assigned to one or more measuring point groups in order to be able to draw more precise conclusions from these measuring point groups about possible error groups or the type of error. Such measuring point groups can be, for example: x-position of the component, rear y-position of the component, etc. Only this assignment of these preferably already existing or used measuring points to measuring point groups as well as their evaluation on the basis of the algorithm is an "additional effort" according to the invention, since the measuring points and the acquisition of their measured values are already available or carried out as standard for the purpose of monitoring the dimensional accuracy of the body component itself.

The designations x, y and z refer to common vehicle coordinate systems. The direction x thus extends in a longitudinal extent, the direction y in a lateral extent normal to the direction x and the direction z extends in a vertical extent of the component and/or the vehicle.

In accordance with one or more embodiments, the predefined measuring points are assigned to exactly seven measuring point groups, in particular, an x-measuring point group, two y-measuring point groups (preferably in the x direction front and rear) and four z-measuring point groups (preferably front left and right and rear left and right).

In accordance with one or more embodiments, each measuring point group is assigned exactly to one locator of the positioning device, wherein the dimensional accuracy at the assigned locator is determined by the control unit from a position deviation in a measuring point group. Multiple measuring point groups can be assigned to a locator.

In accordance with one or more embodiments, the positioning devices each have exactly four locators, so that a body component of a motor vehicle to be manufactured can be geometrically positioned exactly on the positioning device. The four locators are preferably formed by an xyz locator, i.e., a locator which determines the position in the directions x, y, and z, a yz locator which determines the positions of the component in the y and z directions, and two z locators which only determine the positioning in the z-direction, i.e., vertically.

In accordance with one or more embodiments, the positioning devices each have additional support points in addition to the locators to prevent sagging of the body components positioned on the positioning device. These support points thus support the supported component in the z-direction but are not used for the exact positioning of the component.

DRAWINGS

One or more embodiments will be illustrated by way of example in the drawings and explained in the description hereinbelow.

DESCRIPTION

Figure 1:
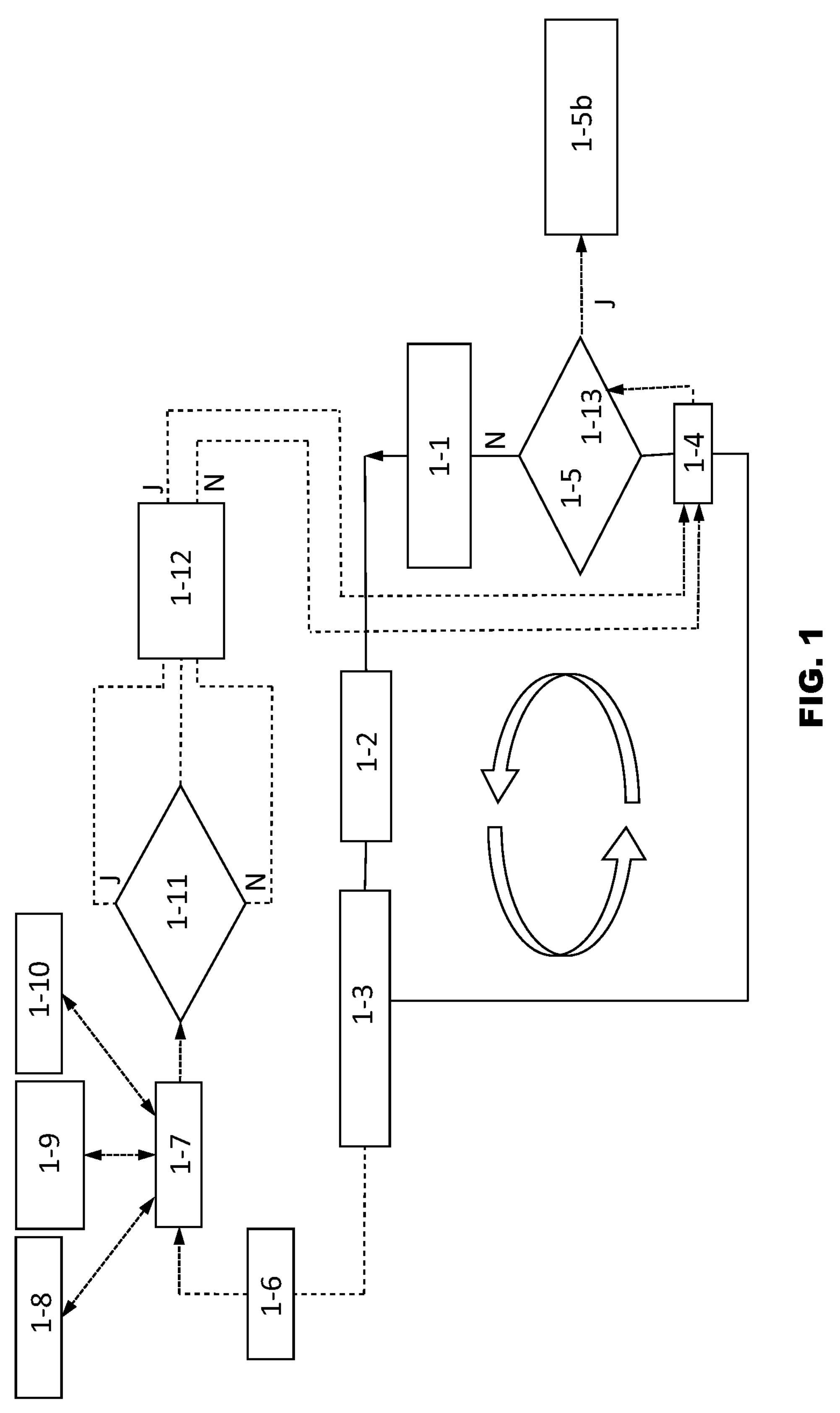
FIG. 1 illustrates a sequence diagram of a motor vehicle manufacturing process of a method, in accordance with one or more embodiments.

FIG. 1 illustrates a sequence diagram of process blocks for a motor vehicle manufacturing process of a method, in accordance with one or more embodiments. The reference characters denote individual steps or process blocks of the sequence diagram.

Process block 1-1 is a loading station, in which the start of a body shell construction process or production process is initiated by introducing a positioning device P into a loading station. Process block 1-2 is a production run of a body component K in a body shell construction plant. Process block 1-3 is possible measured value collection of measured values M in the nth run via inline stations or inline measuring stations, i.e., acquisition of component measurement data of the body component K. 1-4 denotes a reading station (RFID or similar).

Process block 1-5 is a decision step, e.g., rejection (Rejection station)? J denotes a "Yes" and N denotes a "No."

Process block 1-5*b* is a discharge of empty geo-skid P for metrology/correction.

Process block 1-6 is an interface measuring system.

Process block 1-7 is a database of measurement data M for calculation algorithm.

Process block 1-8 is a run counter (counts geo-skid runs/measurement cycles).

Figure 2:
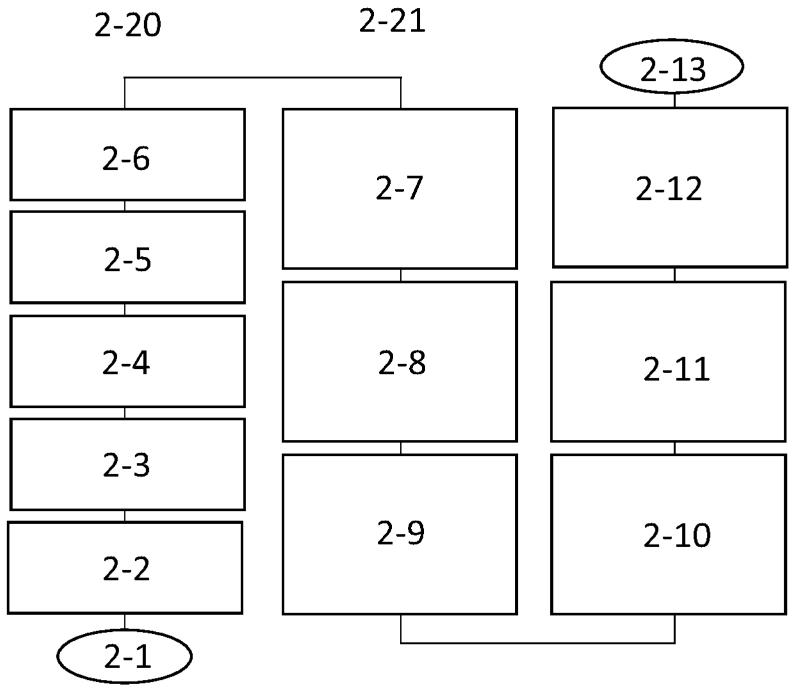
FIG. 2 illustrates process blocks of a method determining the dimensional accuracy of a transportable positioning device by evaluating the measuring points by a control unit, in accordance with one or more embodiments.

Process block 1-9 is a calculation algorithm (program code) (See, FIG. 2).

Process block 1-10 is a visualization of calculations/deviations/evaluations of the measurement data of process block 1-7, M by calculation algorithm of process block 1-9.

Process block 1-11 is a decision process block, geo-skid P conspicuous since n runs in relation to cycle?

Process block 1-12 is a MES production system. Process block 1-13 is, as in process block 1-5, a decision step, e.g., rejection (Rejection station)? For the possibility to transport a geo-skid P from the cycle to a defined parking position.

In a process cycle of the motor vehicle production cycle, a geo-skid P, i.e., a transportable positioning device P, is transported through a production plant and distinctive defined characteristics (=distinctive measuring points of a respective measuring point group) of the components or assemblies transported thereon are measured by a measuring system as measuring points M during each cycle.

The production cycle begins with Process block 1-1, the insertion of the geo-skid into a production plant. Here, this is provided with components which are later subjected together to a processing process, such as welding, during the production run or processing run of process block 1-2. Between and/or at the end of the production run of process block 1-2 there is the possibility to generate measurement data at process block 1-3 at least once per cycle which are transferred a database at process block 1-7 via an interface at process block 1-6. Among other things, the database at process block 1-7 also stores data such as the number of cycles at process block 1-8. In addition, the calculation algorithm at process block 1-9 is running in a control unit, which evaluates the geometrical properties of the geo-skid P from the measurement data M obtained and calculates whether the specified permissible maximum deviations are adhered to in relation to a defined process cycle and measurement cycle (see functionality algorithm in FIG. 2).

If a deviation is detected during the check at process block 1-9, a message is generated, for example in the form of an SMS, an email, or the like, and is sent to a defined distribution list by the production system at process block 1-12. In this system, a process is also started which causes the affected positioning device P to be noted and recognized when a defined reading point at process block 1-4 is reached, for example by RFID, and transported to a parking position in the next rejection station process block at 1-13. For example, the geo-skid/positioning device P cannot then be reintroduced into the system without manual approval. This process, through the algorithm at process block 1-9 and the geometric deviations detected therewith, makes it possible that no lower-quality or reject products can be produced in the production plant.

FIG. 2 illustrates process blocks of a method for determining the dimensional accuracy of a transportable positioning device P by evaluating the measuring points M by a control unit, and thus, the algorithm in process block 1-9 of FIG. 1. Process block 2-20, for each measuring point group. Process block 2-21, for each geo-skid ID and each data point. Process block 2-1, start of the method. Process block 2-2, calculation of abrupt changes. Process block 2-3, correction of mean values to zero. Process block 2-4, calculation of covariance matrix. Process block 2-5, calculation of optimal displacement. Process block 2-6, grouping displacement according to geo-skid ID. Process block 2-7, calculation of abrupt changes in the optimal displacements. Process block 2-8, calculation of mean value and standard deviation since last jump. Process block 2-9, calculation of probability value outside tolerance, for example ±0.2 mm. Process block 2-10, calculation of probability tolerance exceedance of at least one characteristic per geometry skid. Process block 2-11, visualization of time series of optimal displacements and mean values. Process block 2-12, sorting geo-skids by probability tolerance exceedance. Process block 2-13, end of method.

The function of the algorithm is to recognize the NIO (not-in-order) geometry skids, i.e., geo-skids=positioning devices P, from the standard inline measurement data of the body measuring points. For this purpose, the measurements of all measuring points M are first examined for abrupt changes due to manual interventions. Each section with a constant mean is corrected by this, resulting in data series with a total mean of zero.

Because errors of the geo-skid P always affect multiple characteristics at the same time, the measuring points M are combined into groups which change together due to a defect. For example, a shift in the x direction, if it arises from a defective geometry skid P, can be observed at all measuring points M. The reason for this is that the orientation here only takes place at a single point. If this is not correct, the entire body shell, the body component K, is displaced. In the y-direction, the front and rear are oriented separately. That is why errors show up either at all points at the front or at all points at the rear. It is similar in the z-direction, but here it is adjusted at all four vertices, which is why errors arise at the left front, right front, left rear, or right rear, but always common to all characteristics. For each of these seven areas, the relevant points were defined and combined into measurement point groups. For each group, the so-called Mahalanobis distance is used to estimate what characterizes a “normal” data point from the data.

For measurements in the y- and z-directions, the distance between the support point, the application point and the measuring point M also plays a role. When locating a component using the geo-skid P, it is moved at different points in order to align it correctly. One application point is the one that is set up during the location and where an unwanted displacement may occur. A support point A is a point around which the component rotates during setup. These change depending on the application point. Each measuring point group has exactly one application point but can have multiple support points A; the evaluation of a measuring point group results in the deviation of a certain application point. Not all measuring points M are exactly on a straight line with the application point and the support point A. As an approximation, measuring points M are projected onto the closest connecting line of the application point and the support point A. If a measuring point M is closer to the support point A than the application point, a displacement of the application point can only be observed at the measuring point to a smaller extent. The converse applies if the measuring point M is further away from the support point A than the application point. The displacement factor which is taken into account is given by the lever between the points.

After that, all characteristics in each group are displaced together until the data point appears as normal as possible. This displacement gives an estimate of how great the influence of the geo-skid P was on the measurements.

By observing the same geo-skid P during multiple runs with different bodies K, it can be determined whether a systematic deviation of the measurement data is actually caused by the geo-skid P. If a similar displacement in the same direction is determined for many runs, a defect of the geo-skid P is likely. To quantify this, the results are examined for abrupt changes and finally the average of the displacements since the last jump is formed. This is suitable as an estimate for the actual displacement of the geo-skid P. Finally, for each geometry skid P, the probability is calculated for a deviation of more than ±0.20 mm—depending on the tolerance specification of the standard used, for example ±0.20 mm.

For example, the results are output as text in the console. Geo-skids P are sorted according to the probability of a tolerance exceedance in at least one measurement point group. In addition, the best estimate for the deviation of a measurement point group with standard deviation and the number of measurements used for the estimate value since the last change point compared to the total number of measurements according to the data set used is shown.

In the case of automated rejection, the probability value is used for the decision. For this purpose, a limit value and a minimum number of measurements are defined (for example: 80% probability for deviation of more than ±0.20 for at least 20 measurements). If the condition is met, the decision step is then taken according to FIG. 1, step 1-11.

Figure 3:
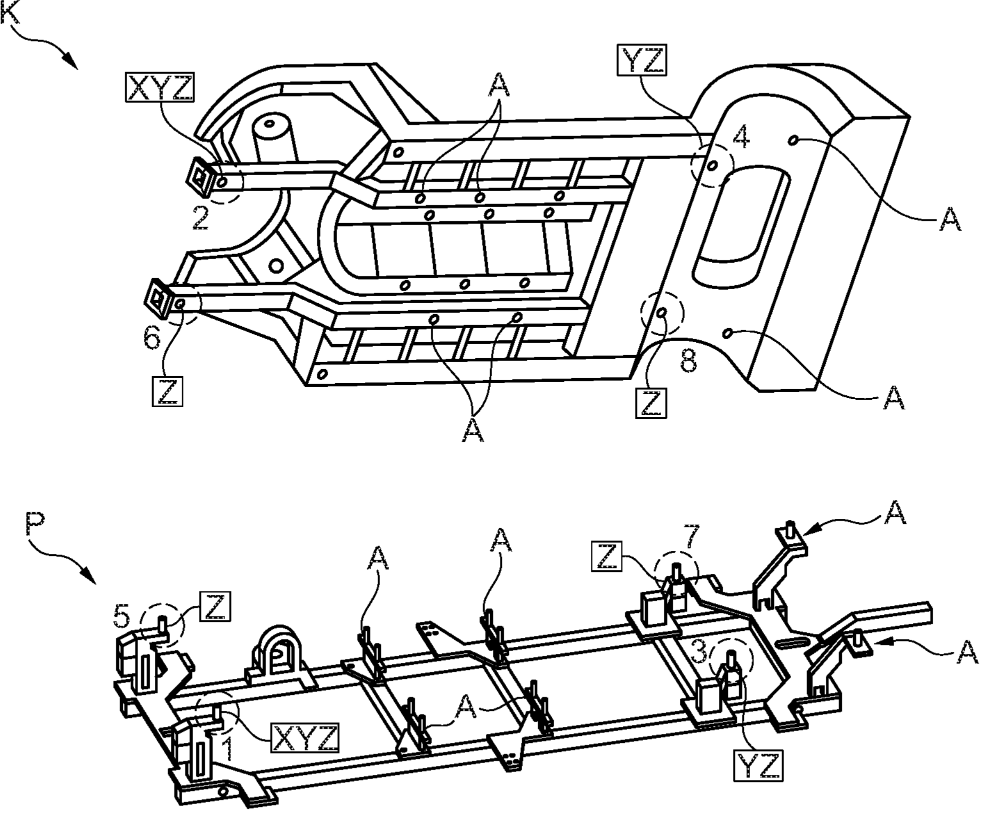
FIG. 3 illustrates a geometric orientation of a body part (top) by a positioning device (bottom) and the locators used.

FIG. 3 illustrates the geometric orientation of a body component K (top) by a positioning device P (bottom) and the locators used. The representation of the positioning device P (bottom) shows four locators 1, 3, 5, 7, via which the orientation of the component, in this case a vehicle underbody, to the geo-skid P is carried out, namely 1, 3, 5, and 7. The corresponding openings 2, 4, 6, and 8 in the representation of the body component K (top) correspond to this. In addition to these four locator points 1, 3, 5, and 7, further support points A in the z direction are provided on the geo-skid P and on the component K.

With regard to, for example, measuring point group “x”: The orientation of the component K in the x-direction of action on the geo-skid P is carried out via the main locator xyz (i.e., responsible for positioning in the x, y, and z directions) 1 of the geo-skid P on the left front and a round hole 2 in the component K. If the geo-skid P has a dimensional deviation in the x-direction, then the whole component K is affected, visible in all, for example, fifty-seven x-measuring characteristics M on the component. Measuring point groups y front and y rear: The y-orientation takes place at the front as well as in the x-direction of action via the locator xyz 1 of the geo-skid P at left front. If the geo-skid P has a dimensional deviation in the y-direction in the front area, the component K is also affected in the front area, visible in the twenty-six y-measuring characteristics M at the front, for example.

In contrast to the x-direction of action, the y-direction of action is further oriented in the rear area by the locator yz 3 on the geo-skid P and a slotted hole in the bottom group 4. A dimensional deviation at the geo-skid P rear in the y-direction of action thus only affects the rear area of the component K and is visible in the 11 y-measuring characteristics M at the rear. The measuring point groups z at left front, z at right front, z at left rear and z at right rear: The same principle applies in the z-direction of action. The orientation of the component K is carried out via all 4 locators on the geo-skid P, namely 1, 3, 5, and 7, and the respective holes on the component K, namely 2, 4, 6, and 8. Numeral 6 is a slotted hole and 8 is a fixing hole without immobilization.

If there is a z-deviation at the left front of the geo-skid P, this is visible in all twelve z-measurement characteristics M at left front. This deviation at the left front, which is caused by the locator 1 on the geo-skid P, has no causal effect on the z-characteristics on the component in the other three z-measuring point groups, because these are oriented by 3, 5, and 7. The same principle applies to the other three locators.

On the role of locators and supports: the component K is geometrically oriented on the geo-skid P via the locators. There are four locators (1, 3, 5, and 7) for determining the position according to the 3-2-1 locator concept, illustrated in FIG. 3. The component is only placed on the additional six z-supports A so that it does not sag, but there is no geometric orientation there. Only locators 1, 3, 5, and 7 are geometrically relevant for the measuring point groups. The representation of the z-supports A in FIG. 3 illustrates where the geo-skid P touches the component K, apart from the locators relevant for positioning 1, 3, 5, and 7.

Figure 4:
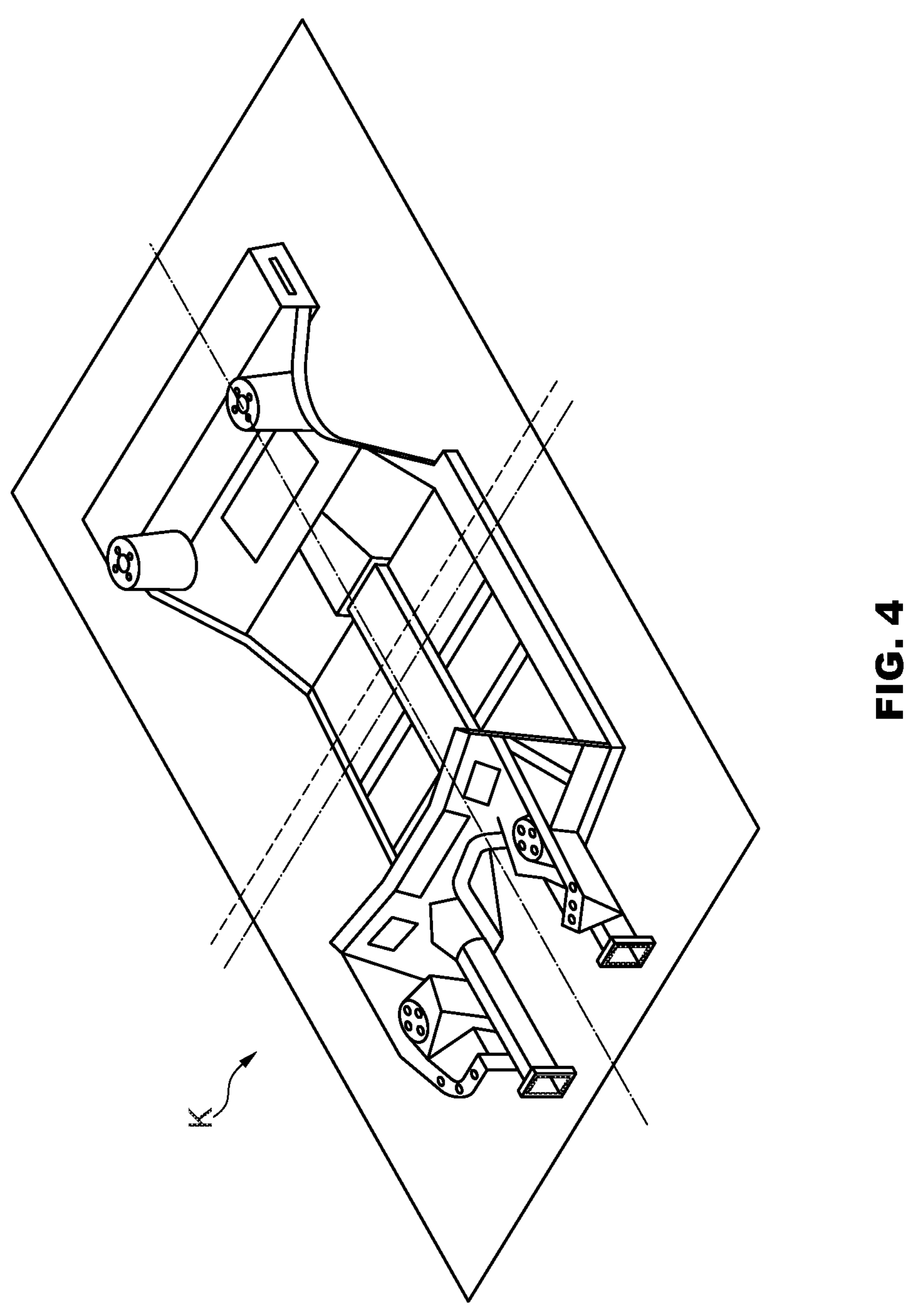
FIG. 4 illustrates the measuring point groups on a body component.

FIG. 4 illustrates the seven measuring point groups on a body component K (vehicle underbody). There are only measuring point groups on the component K. They make up a combination of measurement characteristics/measuring points M, which behave in the same way, since they are influenced in the same way by a common orientation (=respective locator on the geo-skid). The measuring characteristics M are specified by the measurement planning and the cycle time. According to their direction of action and the location on the component K, they are assigned to the correct measuring point group for the calculation of the algorithm.

This measurement planning/measuring point planning is preferably based exclusively on the body component K or on which measuring points are required for process control/series monitoring of the body component K or for checking the dimensional accuracy of the body component itself. Only on the basis of these already determined measuring points are the already existing measuring points assigned to the measuring point groups or assigned to the respective measuring point groups according to the effect for the individual spatial directions caused by their location.

FIG. 4 illustrates: a black frame which includes all measuring points M of the measuring point group x, here, for example, fifty-seven measuring points M. A dotted line separates the measuring points M into the y-front area which includes twenty-six measuring points M and the y-rear area, which includes eleven measuring points M. Two intersecting dashed lines separate the measuring points M into the z-front left area (twelve measuring points), the z-front right area (twelve measuring points), the z-rear left area (six measuring points), and the z-rear right area (six measuring points). Many or all individual measuring points M can be assigned to multiple areas or measuring point groups.

Example measuring point group x: The main locator on the left front influences all fifty-seven x characteristics (measuring points M) over the entire component, because the orientation in the x-direction of action only takes place there at the front.

Example measuring point groups y at front and rear: The main locator at the left front influences twenty-six y-characteristics M at the front. The locator at the left rear influences eleven y-characteristics M at the rear.

Example measuring point group z at left front: The main locator on the left front influences twelve z-characteristics M at the left front. The same principle applies to the other three measuring point groups of the z-direction of action.

Figure 5:
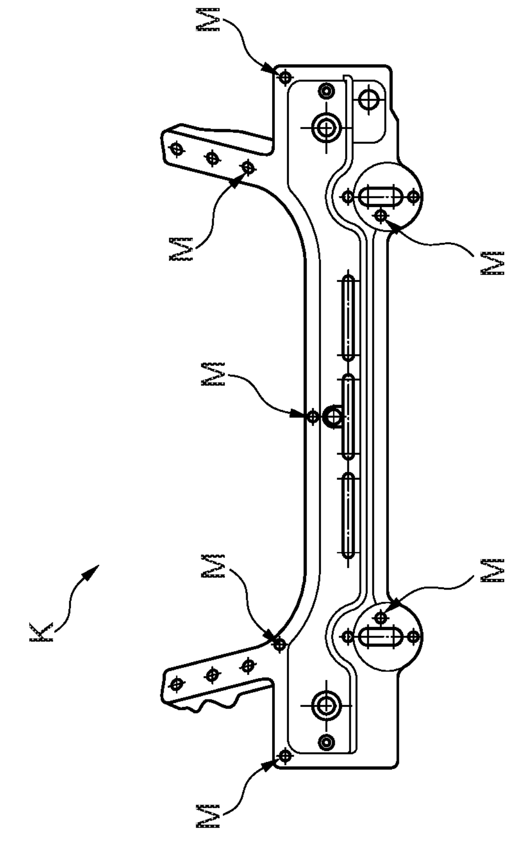
FIG. 5 illustrates the assignment of measuring points to measuring point groups on a body component.
Figure 5:
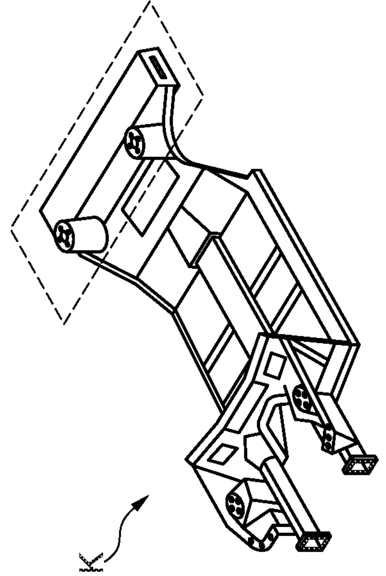

FIG. 5 illustrates a schematic representation of the assignment of measuring points M to measuring point groups on a body component K, namely on a rear end.

The small illustration of FIG. 5 at the top left shows the position of the rear end (FIG. 5 on the bottom right) in the body component of FIG. 4. In the case of a rear end, seven measuring points M are measured, of which seven measuring points M relate to the x-direction, two measuring points M relate to the y-direction and two measuring points M relate to the z-direction.

These measuring points M (measuring characteristics) are assigned in:

7 x-measuring characteristics for measuring point group x 2 y-measuring characteristics for measuring point group y at the rear 1 z-measuring characteristic for measuring point group z at the rear right 1 z-measuring characteristic for measuring point group z at the rear left A measuring point group thus corresponds to an area. In total, there are seven measuring point groups (1x, 2y, 4z) in which measuring characteristics M of the product K behaving in a correlated manner are grouped. For each measuring point group there is a number of measuring points M. Using the example of the rear cladding (FIG. 5), the 7 x-characteristics (=x measuring points M) are assigned to the whole measuring point group x (=framed area in FIG. 4) over the entire body K, since all 57 x-characteristics M in the product K behave in a correlated way regardless of the position if the device has a displacement in x. The 2 y-characteristics M are assigned with regard to the rear cladding component only to the y-measuring point group at the rear (FIG. 4 behind dotted line), since y-characteristics (measuring points) in the front area of the body K do not behave in a correlated way (due to the distance to the rear locator and compensation properties due to the rigidity of the body).

The two y-measuring point groups (y front and y rear) are divided into a front area and a rear area of the (customer) component K as can be seen at the dotted line in FIG. 4.

Since the component K is located both at the right and left rear of the device, a deviation on one side does not mean a deviation on the other side. According to the same logic, the z-characteristics are grouped into measurement point groups per side and front/rear, since the correlating characteristics M can be combined into 4 areas. The four z-measuring point groups are divided into a front area and a rear area as well as a left area and a right area of the component K, as can be seen at the two dashed lines in FIG. 4.

The seven measuring point groups are advantageous for at least the following reasons. The areas arise as a solution to the question "What is the minimum number of groups/areas to generate maximum information?" In the case of a 3-2-1 locating and clamping concept used here for a self-supporting body K and the defined measuring points M on the component K, this is exactly seven. If, for example, further x-areas are defined, these will not bring any additional information, since all x-characteristics M behave the same over the body K. Conversely, if the 2 y-areas were reduced to a single y-area, one would lose relevant information, since the y-characteristics at the front and rear do not correlate and a separation is absolutely necessary.

LIST OF REFERENCE SYMBOLS

A Support point
K Body component
M Measuring point
P Positioning device or geo-skid
X, Y, Z Direction of positioning on locator
J Yes
N No
1 Locator on positioning device
2 Locator opening on body component
3 Locator on positioning device
4 Locator opening on body component
5 Locator on positioning device
6 Locator opening on body component
7 Locator on positioning device
8 Locator opening on body component
1-1 Loading station
1-2 Production run/processing in workstations
1-3 Collection of measured values, acquisition of component measurement data of the body component
1-4 Reading station
1-5 Decision step—reject?
1-5*b* Rejections for measurement technology/correction
1-6 Interface measuring system
1-7 Database of measurement data
1-8 Run counter
1-9 Calculation algorithm
1-10 Visualization
1-11 Decision step—positioning device conspicuous?
1-12 MES production system
1-13 Decision step—reject?
2-1 Start
2-2 Calculation of abrupt changes
2-3 Correction of mean values to zero
2-4 Calculation of covariance matrix
2-5 Calculation of optimal displacement
2-6 Grouping of displacement according to geo-skid ID
2-7 Calculation of abrupt changes in the optimal displacements
2-8 Calculation of mean value and standard deviation since last jump
2-9 Calculation of probability value outside tolerance, for example ±0.2 mm
2-10 Calculation of probability of tolerance exceedance of at least one characteristic per geometry skid
2-11 Visualization of time series of optimal displacements and mean values
2-12 Sorting geo-skids by probability of tolerance exceedance
2-13 End
2-20 For each measuring point group
2-21 For each geo-skid ID (identified positioning device) and each data point

What is claimed is:

1. A method for testing dimensional accuracy of transportable positioning devices for production of a motor vehicle, the method comprising:

providing a plurality of locaters on positioning devices so that each body component of the motor vehicle is accurately geometrically positioned on a respective one of the positioning devices, wherein based on an xyz coordinate system, the locaters include an xyz locator which determines a position of a corresponding body component in x, y, and z directions, a yz locator which determines a position of a corresponding body component in the y and z directions, and z locators which determine a position of a corresponding body component in the z direction;

moving, in a motor vehicle production cycle, the positioning devices with the respective body component positioned thereon to different workstations;

measuring, by a control unit during the motor vehicle production cycle in the workstations and/or in an inline measuring station for an acquisition of measured values in the motor vehicle production cycle, predefined measuring points on each body component positioned on each transportable positioning device as measurement data; and evaluating, by the control unit, the predefined measuring points to determine a dimensional accuracy of each transportable positioning device.

2. The method of claim 1, further comprising identifying, via the control unit, the transportable positioning devices.

3. The method of claim 2, further comprising measuring, during multiple motor vehicle production cycles in the workstations, the predefined measuring points on each body component positioned on the identified transportable positioning devices.

4. The method of claim 3, further comprising evaluating, by the control unit, the predefined measuring points to determine a dimensional accuracy of the identified transportable positioning devices.

5. The method of claim 1, further comprising assigning, by the control unit, the predefined measuring points on a respective body component positioned on each transportable positioning device for an evaluation of the measuring points to one or more predefined measuring point groups.

6. The method of claim 5, wherein the one or more predefined measuring point groups comprise respective measuring points that behave in a correlated way.

7. The method of claim 6, wherein the predefined measuring points are assigned to seven measuring point groups.

8. The method of claim 7, wherein, on the xyz coordinate system, the measuring point groups comprise an x-measuring point group, two y-measuring point groups, and four z-measuring point groups.

9. The method of claim 6, wherein each measuring point group is assigned one locator of each transportable positioning device.

10. The method of claim 9, further comprising determining, via the control unit, a dimensional accuracy at the assigned locator from a position deviation in a measuring point group.

11. The method of claim 1, wherein the positioning devices each have support points which support the corresponding component in the z-direction to prevent sagging of each body component positioned on each transportable positioning device.

12. A method for testing dimensional accuracy of transportable positioning devices for production of a motor vehicle, the method comprising:

providing a plurality of locaters on positioning devices so that each body component of the motor vehicle is accurately geometrically positioned on a respective one of the positioning devices, wherein based on an xyz coordinate system, the locaters include an xyz locator which determines a position of a corresponding body component in x, y, and z directions, a yz locator which determines a position of a corresponding body component in the y and z directions, and z locators which determine a position of a corresponding body component in the z direction;

moving, in a motor vehicle production cycle, the transportable positioning devices with the respective body component positioned thereon to different workstations; and measuring, by a control unit during the motor vehicle production cycle in the workstations and/or in an inline measuring station for an acquisition of measured values in the motor vehicle production cycle, predefined measuring points on each body component positioned on each transportable positioning device.

13. The method of claim 12, further comprising evaluating, by the control unit, the predefined measuring points to determine a dimensional accuracy of each body component.

14. The method of claim 12, further comprising assigning, by the control unit, the predefined measuring points on a respective body component positioned on each transportable positioning device for an evaluation of the measuring points to one or more predefined measuring point groups.

15. A method for testing dimensional accuracy of transportable positioning devices for production of a motor vehicle, the method comprising:

providing a plurality of locaters on the transportable positioning devices so that each body component of the motor vehicle is accurately geometrically positioned on a respective one of the transportable positioning devices, wherein based on an xyz coordinate system, the locaters include an xyz locator which determines a position of a corresponding body component in x, y, and z directions, a yz locator which determines a position of a corresponding body component in the y and z directions, and z locators which determine a position of a corresponding body component in the z direction;

measuring, by a control unit during a motor vehicle production cycle, predefined measuring points on each body component positioned on a corresponding transportable positioning device as measurement data;

determining, by the control unit based on deviations of the predefined measuring points from standard values, probable errors of each transportable positioning device.

16. The method of claim 15, wherein determining the probable errors of each transportable positioning device comprises determining dimensional accuracies of each transportable positioning device outside a defined tolerance range.

* * * * *